United States Patent Office 3,497,008
Patented Feb. 24, 1970

3,497,008
METHOD OF PROPPING FRACTURES WITH CERAMIC PARTICLES
Harold L. Graham and Othar M. Kiel, Houston, Tex., assignors to Esso Production Research Company, a corporation of Delaware
No Drawing. Continuation-in-part of application Ser. No. 579,845, Sept. 16, 1966. This application Mar. 5, 1968, Ser. No. 710,636
Int. Cl. E21b 43/26
U.S. Cl. 166—280
9 Claims

ABSTRACT OF THE DISCLOSURE

A method of propping fractures in a subterranean formation employing hard, ceramic particles having oppositely-disposed surface elements which are linear and parallel. The composition of the particles may be glass or other ceramic material having a resistance to impact abrasion at least as great as soda-lime-silica glass. The particles may have the configuration of cylinders, rods, parallelepipeds, prisms, cubes, plates, or any other configuration which will have linear elements on its surface which are oppositely disposed and parallel.

CROSS REFERENCE TO RELATED APPLICATION

This application is a continuation-in-part of application Ser. No. 579,845 filed Sept. 16, 1966, "Fracture Propping Materials," Harold L. Graham and Othar M. Kiel, and now abandoned.

BACKGROUND OF THE INVENTION

Field of the invention

This invention relates to processes for treating a well in which the formation is fractured. More particularly the invention relates to methods for propping such fractures and displacing proppant particles into the fracture system.

Description of the prior art

Crude oil and natural gas are produced from porous and permeable subterranean formations. The porosity or void space of the formation is a measure of the ability of a formation to store oil or gas. Permeability is a measure of the fluid conductivity of the formation. Permeability is related to the ability of fluids to move through the pores of the formation and is a necessary and essential requirement for production of the reservoir fluids. Where the natural permeability of a formation is low or operations within a well have damaged the ability of the formation to transmit fluids, the productivity and injectivity of the well will be reduced. Remedial operations are necessary to increase the permeability in such cases.

Hydraulic fracturing is a commonly employed method for increasing the permeability of a formation. It is a method for artificially creating channels of high fluid conductivity within the formation and is used to stimulate both production and injection wells.

Hydraulic fracturing is accomplished by subjecting the formation to high pressure fluid which is pumped down the well and into contact with the formation. This high pressure fluid causes the formation to split along planes of weakness when the natural compressive forces and the yield strength of the formation are exceeded. These fractures are zones of high fluid conductivity and greatly increase the effective permeability of the formation.

When the injection rate of the fracturing fluid is reduced, the fractures will tend to close due to the unbalanced compressive forces which are asserted on the formation. To prevent closure of the fractures, propping agents are commonly employed. These propping agents are generally round sand grains, metallic shot, plastic particles, glass beads, or woody materials such as walnut hull fragments and are normally injected with the fracturing fluid to hold the fracture in an open position when fracturing pressure is relieved. Spherical particles of uniform size are generally acknowledged to be the most effective proppants.

The improvement in injectivity and productivity obtained by fracturing a formation depends directly on the fluid conductivity of the propped fracture system. This conductivity is related to both the width of the propped fracture and the permeability of the proppant pack within the fracture. Ideally, the proppant particles should be spaced closely enough to provide sufficient bearing support for the fracture against the load imposed by the compressive froces of the formation and should be distributed so that the restriction to fluid flow is a minimum.

In theory the ideal distribution of most proppant materials is a partial monolayer. Laboratory testing has shown that the commonly employed proppants have sufficient strength to withstand compressive forces encountered in shallow formations even when they are distributed in less than a complete layer in the fracture. Such a partial monolayer, of course, offers less resistance to fluid flow than a full layer of particles within the fracture.

Efforts to establish a partial monolayer distribution of proppant particles, however, have not generally been successful under actual field operating conditions. The operator has little control over the distribution of the particles in the fracture system other than the concentration of the particles in its fluid suspension. Fluid flow anomalies and gravity segregation of the particles in the suspending fluid result in a more random particle distribution than the desired partial monolayer. The effect of gravity segregation is particularly pronounced in vertical fractures due to the excessive settling rates of propping agents of conventional configurations.

Until reliable techniques are developed for establishing a partial monolayer, the majority of fracturing operations will probably continue to employ proppant concentrations designed to provide a "fully packed" or multilayer proppant pack in the fracture. In a fully packed fracture, the proppant particles are subjected to somewhat different stresses. For example, tests have shown that in individual glass sphere resists crushing satisfactorily under the moderate stresses encountered in shallow formations when placed in contact with a plane surface that deforms slightly, thereby spreading the load over a substantial area of the sphere. However, when placed in multilayer packs, glass spheres shatter more readily since the entire load is concentrated upon extremely small points of contact. The generation of fines from shattered spheres is highly objectionable, even if no loss of fracture width occurs, since the fines cause a severe loss of proppant permeability because of their tendency to plug the interstices of the remaining proppant particles.

An equally important problem with the previously employed proppants is their unsatisfactory performance in deeper formations. As the shallower oil producing formations are depleted, the industry has turned to deeper and deeper oil reserves to supply the increasing demand. At these greater depths the compressive forces are so high that the previously employed proppants cannot satisfactorily fulfill their intended function even if they are ideally distributed within the fracture. A high proportion of the particles, even in a monolayer, fail due to the excessive load imposed. Embedment of the proppants also is more severe in the deeper formations with a consequent reduction in separation of the fracture walls and in fluid conductivity of the fracture system.

SUMMARY OF THE INVENTION

In the method of this invention, fractures in subterranean formations are propped with particles composed of a hard, ceramic material and having linear surface elements which are parallel and oppositely disposed which respect to the center of the particle.

The object of this invention is to provide a method for propping fractures in subterranean formations to improve the fluid conductivities of such fractures. It is another object of this invention to provide a method of propping fractures with a proppant particle which has improved load bearing characteristics. It is another object of this invention to provide a method for propping fractures with a particle having a low settling rate. It is another object of this invention to provide a method for propping fractures with a particle with a reduced tendency to embed in the fracture wall. It is another object of this invention to provide a method for propping fractures by specifically orienting the proppants in the fracture for improved loading. These and other object of the invention will be more fully understood by reference to the following description.

DESCRIPTION OF THE PREFERRED EMBODIMENT

In accordance with the present invention, the objects are achieved by the use of a hard, ceramic proppant particle having a particular shape. Specifically, the use of glass or other ceramic proppant particles having opposing parallel linear surface elements provides improved fracture conductivity due to the superior ability of such particles to resist crushing and embedment, and due to their ability to provide increased proppant permeability in multilayer packs.

Particles having linear, parallel, opposite surface elements include cylinders, rods, parallelepipeds, prisms, cubes, plates, and various other solids of both regular and irregular configurations. A cylinder has linear, parallel, opposite surface elements in the sense that lateral loading of a cylinder by parallel fracture walls forms parallel lines of contact on opposite "sides" of the cylinder. Also, a triangular prism, for example, may support the load by face contact with one wall and by edge contact with the opposite wall. The edge formed by two faces of the prism is a linear, parallel, opposite surface element with respect to a linear element of the third face.

The preferred composition for the proppant particles of this invention is a hard glass. The term glass as used herein refers to any silicic, inorganic product of fusion which has cooled to a rigid condition without crystallizing. The term hard glass refers to a glass which is difficult to scratch and has a high softening point. Specifically, such a glass has a resistance to impact abrasion which is equal to or greater than common soda-lime-silica in its unannealed, untempered state. The resistance to impact abrasion of a glass and its softening point are interrelated. Glasses with high softening points are relatively resistant to impact abrasion; low softening point glasses such as the lead glasses are less resistant and hence generally unsatisfactory. Therefore, a glass which is suitable for use in the practice of this invention should have a softening point (the temperature at which the viscosity of the glass equals 7.65 poises) which is at or above 650° C. Some typical glass compositions which will meet these criteria are soda-lime-silica, aluminosilicate, borosilicate, soda-zinc-silica, soda-barium-silica, high silica, and aluminoborosilicate glasses. Other ceramic materials will also have sufficient resistance to impact abrasion for use in this invention. Notable examples are ceramics and porcelains such as sintered alumina, steatite, and mullite.

The load carrying capacity of the hard glass proppants may be further increased using techniques known to those skilled in the art. Typical techniques for increasing the strength of glass substances include annealing, tempering, surface ion exchange and sudden quenching from a molten state.

Although it has been found that materials having a high resistance to impact abrasion and a high softening point have superior load carrying capacities, the underlying reasons for this are not completely understood. It is felt that the increased load carrying capacity may be attributed to a decrease in surface flawing. It is well recognized that the presence of surface flaws radically reduces the strength of glass particles. Such flaws serve as sites for stress concentration and the particles have a tendency to fail under applied load at the sites of such flaws. This principle has been seen by anyone who has attempted to break a glass rod by flexing it between his hands. An unmarred rod may withstand considerable stress without rupture, but, if the surface of the rod is scored lightly with a hard instrument, the rod will break at the point of scoring with much less exertion.

It has been found that glass proppants having low softening and melting points and a low resistance to impact abrasion are generally unsuitable for the practice of this invention. These softer glasses, which generally contain a high proportion of lead oxide, are more subject to surface marring than the hard glasses. The decreased load carrying capacities of the softer glasses are probably due to the presence of excessive surface flaws which are created by abrasion during contact with the steel conduits through which the particles must travel and with the walls of the fracture.

The proppant particles should preferably have an elongated, cylindrical configuration. It has been found that fractures propped with particles having such a configuration have surprisingly superior fluid conductivities in comparison to fractures propped with spherical particles under comparable loading conditions. These improved results are a product of a number of basic distinctions between these two configurations.

A cylindrical particle of a given diameter and a length equal to its diameter has a greater load bearing capacity than a spherical particle of equal diameter. Since the spherical particles have a lower load bearing capacity, they are more prone to crushing which produces a higher proportion of fines in the proppant pack. It is well established that the presence of fines will reduce the permeability of the pack and the fluid conductivity of the propped fracture.

A cylinder having a length equal to its diameter is more resistant to embedment in the fracture wall than an equal diameter sphere. For a given depth of embedment the cross-sectional area of the cylinder in the plane of embedment will be greater than that of a sphere embedded by the same amount. The increased cross-sectional area of a cylinder will have a greater resistance to further embedment. Therefore, where the force imposed per particle is the same, cylindrical particles will embed less and will be more effective in preventing the fracture from closing than spheres. This resistance to embedment will give a greater fracture width and consequently a higher fluid conductivity.

A cylindrical particle having a length equal to its diameter will have a lower settling rate than an equal diameter sphere. This lower settling rate is due to the greater surface area per unit volume of the cylinder. This lower settling rate will give a more uniform distribution of the cylindrical particles in vertical fracture systems.

It has also been found that the orientation with respect to the fracture walls of cylindrical particles, as well as other particles having opposing parallel linear surface elements, can be controlled. Under laminar flow conditions proppant particles having opposing parallel linear surface elements will normally orient themselves so that these surface elements are aligned in the direction of fluid flow. Since the fluid flow in a fracture is principally parallel to the fracture walls, these particles will align so that the opposing surface elements are contacted by the fracture walls upon closure. This manner of contact will maximize the load bearing capacity of the cylindrical particles.

It is preferred that the proppant particle be elongated. The length of the particle should generally be at least equal to the diameter of a circle circumscribed about its base. Preferably, this length should exceed the diameter by at least 30 percent. Such elongation can improve the permeability of the proppant pack by reducing its tortuosity. Tortuosity represents the departure of a porous system from the equivalent of a straight bore capillary and a highly tortuous system will have a reduced permeability. It is evident that, if the length of the proppant particles is increased, the flow channel between parallel particles will be longer and the flow channel between a plurality of packed particles will more nearly approach the configuration of a straight bore capillary. Thus, the greater the proppant length, the greater the permeability of the pack. The length of the particles, however, is limited by practical considerations. To prevent bridging, their length should not exceed the diameter of the perforations through which they must pass.

The use of elongated cylindrical proppant particles is a preferred embodiment of the invention. Although a right circular cylinder is contemplated, the use of other cylindrical shapes is within the scope of the invention. It may be desirable to employ particles having a circular cross-section and rounded ends to improve fluid flow around these end portions. The diameter of the cylindrical particle lies in the range from 0.02 in. to 0.3 in., and preferably from 0.5 to 0.2 in.

The cubical proppant particles of the invention should normally have an edge length in the range from about 0.02 in. to about 0.3 in., and preferably from 0.05 to 0.2 in. The prisms have a base perimeter in the range from about 0.06 in. to about 0.9 in., and preferably from 0.15 in. to 0.6 in. For best results, the length of the prism should be substantially greater than the diameter of a circle superscribed about the base. The plates have a thickness in the range from 0.1 in. to 0.1 in., and polygonal or circular faces having a perimeter in the range from 0.07 to 1.0 in.

In practicing the invention, the glass or other ceramic particles are usually added to a fracturing fluid in a concentration from 0.2 lb. per gallon of fluid up to as much as 12 lbs. per gallon or more, preferably, from 2 to 8 lbs. per gallon when a fully packed fracture is desired. The lower concentrations generally form a partial monolayer. The proppant-laden fluid is injected into the well in accordance with known fracturing procedures, using conventional equipment.

In accordance with a preferred embodiment, the proppant particles of the invention are added, in the same concentrations as are stated above, to a fracturing fluid having a viscosity of at least 100 cps. and preferably at least 300 cps. The proppant-laden, viscous fluid is then injected into a well at a sufficient pressure and flow rate to generate the fracture and to displace the fluid into the fracture under laminar flow conditions in accordance with known procedures for the use of viscous fracturing fluids.

In some instances it may be desired to inject the proppant ladened fluid into a previously fractured or naturally fractured reservoir. This procedure would be similar in operation to the fracturing-propping procedure but generally the injection pressure will be less.

What is claimed is:

1. A method of propping a fracture in a subterranean formation surrounding a wellbore comprising injecting into a fracture a plurality of ceramic particles having a resistance to impact abrasion at least as great as soda-lime-silic glass and having liner surface elements which are parallel and disposed oppositely with respect to the centers of the particles.

2. A method as defined in claim 1 wherein the particles have a substantially circular cross-section.

3. A method as defined in claim 1 wherein the particles have a polygonal cross-section.

4. A method as defined by claim 1 wherein the particles are glass.

5. A method as defined by claim 1 wherein the particles are injected into the fracture in a fluid suspension under conditions of laminar flow.

6. The method as defined in claim 1 wherein the particles have a cylindrical configuration.

7. The method as defined in claim 1 wherein the particles have a length which is at least equal to their width.

8. The method as defined in claim 7 wherein the length of the particles is at least thirty percent greater than their width.

9. A method of propping fractures in a subterranean formation surrounding a wellbore comprising injecting into the fracture under laminar flow conditions a fluid suspension of ceramic particles having opposing parallel linear surface elements and having a resistance to impact abrasion at least as great as soda-lime-silica glass.

References Cited

UNITED STATES PATENTS

| | | |
|---|---|---|
| 2,944,018 | 7/1960 | Borcherdt. |
| 2,962,095 | 11/1960 | Morse _____ 166—42.1 X |
| 3,149,673 | 9/1964 | Pennington _____ 166—42.1 |
| 3,175,615 | 3/1965 | East et al. _____ 166—42.1 |
| 3,316,967 | 5/1967 | Huitt et al. _____ 166—42.1 |
| 3,370,650 | 2/1968 | Watanabe _____ 166—42.1 |
| 3,389,982 | 6/1968 | Schott _____ 65—21 |

JAMES A. LEPPINK, Primary Examiner

IAN A. CALVERT, Assistant Examiner